US012515937B2

(12) United States Patent
Fantappiè et al.

(10) Patent No.: US 12,515,937 B2
(45) Date of Patent: Jan. 6, 2026

(54) BEVERAGE FLAVOR DOSING SYSTEM

(71) Applicant: PepsiCo, Inc., Purchase, NY (US)

(72) Inventors: Giancarlo Fantappiè, Rancho Palos Verdes, CA (US); Steven T. Jersey, Laguna Niguel, CA (US); Diego Macrellino, Torrance, CA (US)

(73) Assignee: PepsiCo, Inc., Purchase, NY (US)

(*) Notice: Subject to any disclaimer, the term of this patent is extended or adjusted under 35 U.S.C. 154(b) by 0 days.

(21) Appl. No.: 18/455,194

(22) Filed: Aug. 24, 2023

(65) Prior Publication Data

US 2024/0067514 A1 Feb. 29, 2024

Related U.S. Application Data

(60) Provisional application No. 63/373,525, filed on Aug. 25, 2022.

(51) Int. Cl.
*B67D 1/00* (2006.01)

(52) U.S. Cl.
CPC ......... *B67D 1/0041* (2013.01); *B67D 1/0051* (2013.01); *B67D 1/0079* (2013.01); *B67D 1/0085* (2013.01); *B67D 2001/0088* (2013.01)

(58) Field of Classification Search
CPC .. B67D 1/0041; B67D 1/0051; B67D 1/0085; B67D 1/0079; B65D 83/386; B65D 2001/082
See application file for complete search history.

(56) References Cited

U.S. PATENT DOCUMENTS

| | | | | | |
|---|---|---|---|---|---|
| 2,966,283 | A | * | 12/1960 | Darvie | B65D 83/386 30/41 |
| 3,451,593 | A | * | 6/1969 | Dillarstone | B65D 83/384 222/398 |
| 3,506,004 | A | * | 4/1970 | Mann | A61M 15/009 222/533 |
| 4,238,055 | A | * | 12/1980 | Staar | B05B 11/1052 222/162 |
| 4,305,528 | A | * | 12/1981 | Craig | B65D 83/303 222/530 |
| 4,401,271 | A | * | 8/1983 | Hansen | B65D 83/303 239/592 |
| 4,401,272 | A | * | 8/1983 | Merton | B65D 83/303 239/592 |
| 5,108,013 | A | * | 4/1992 | VanBrocklin | B05B 11/1018 222/542 |

(Continued)

OTHER PUBLICATIONS

International Search Report and Written Opinion in International Application No. PCT/US2023/072813, mailed Dec. 20, 2023 (12 pages).

*Primary Examiner* — Frederick C Nicolas
*Assistant Examiner* — Randall A Gruby
(74) *Attorney, Agent, or Firm* — Sterne, Kessler, Goldstein & Fox P.L.L.C.

(57) ABSTRACT

A flavor dispensing system includes a dispensing system configured to dispense flavor concentrates with minimal installation support. In aspects, the flavoring dispensing system includes one or more concentrate cartridges with a pump cap that are fluidly connected to a nozzle. A pump actuator in the flavor dispensing system moves the concentrate cartridges and thereby actuates the pump cap to dispense concentrate.

17 Claims, 8 Drawing Sheets

(56) References Cited

U.S. PATENT DOCUMENTS 5,169,029 A * 12/1992 Behar .................... B65D 81/32 128/200.23
5,192,006 A * 3/1993 Van Brocklin ..... B05B 11/1066 222/321.9
5,226,563 A * 7/1993 Coggiola ............. B65D 83/386 222/386
5,310,095 A * 5/1994 Stern .................... B65D 83/303 222/402.1
5,421,519 A * 6/1995 Woods ................. B65D 83/303 239/394
5,423,458 A * 6/1995 Tourigny ............. B65D 83/303 222/566
5,503,306 A * 4/1996 Knickerbocker ... B05B 11/1047 222/321.2
5,505,194 A * 4/1996 Adjei ................ A61M 15/0086 128/200.23
5,649,649 A * 7/1997 Marelli ............... B05B 11/1061 222/321.2
5,655,194 A * 8/1997 Landa .................. G03G 15/104 222/162
5,752,627 A * 5/1998 Vandromme ....... B05B 11/1023 222/137
5,884,819 A * 3/1999 Fuchs ................. B05B 11/1018 222/321.2
5,887,767 A * 3/1999 Riley ..................... B65D 83/75 222/538
5,934,518 A * 8/1999 Stern ..................... B05B 1/1654 222/402.1
5,992,704 A * 11/1999 Jager-Waldau ..... B05B 11/1074 222/321.9
6,155,457 A * 12/2000 Landa .................. G03G 15/104 222/327
6,308,863 B1 * 10/2001 Harman ................. B65D 83/68 239/304
6,318,600 B1 * 11/2001 Winnett ............... B65D 83/386 222/402.1
6,328,185 B1 * 12/2001 Stern ...................... B65D 83/52 239/394
6,412,657 B2 * 7/2002 Riley ................... B65D 83/303 222/402.1
6,419,125 B1 * 7/2002 Kim ...................... B05B 11/105 222/321.2
6,824,022 B2 * 11/2004 Marelli ................. B05B 11/105 222/321.9
7,044,338 B2 * 5/2006 Roden .................. B65D 83/303 222/402.1
7,175,053 B2 * 2/2007 Simon .................. B65D 83/386 222/320
7,389,947 B2 * 6/2008 Denton ............... B05B 11/0089 222/402.1
7,410,079 B2 * 8/2008 Kuwahara ........... B05B 11/1077 222/321.2
7,845,523 B1 * 12/2010 Greer, Jr. .............. B05B 1/1654 222/402.1
8,317,065 B2 * 11/2012 Stern ......................... B05B 1/02 222/394
8,573,443 B2 * 11/2013 Natterer ................ B05B 12/122 222/173
8,839,994 B2 * 9/2014 Mason .................... F16L 37/04 222/402.1
8,887,963 B2 * 11/2014 Zizoune ............... B65D 83/202 222/402.1
8,893,927 B2 * 11/2014 Olson ..................... C02F 1/003 222/162
8,978,936 B2 * 3/2015 Eini ..................... B65D 83/525 222/402.1
10,065,791 B1 * 9/2018 Charles ............... B05B 11/0091
10,131,528 B2 * 11/2018 Webster ............... B67D 1/0894
11,530,040 B2 * 12/2022 Kominami ............ B05B 13/005
11,918,775 B2 * 3/2024 Spohn ............... A61M 5/14546
12,083,321 B2 * 9/2024 Spohn ............... A61M 5/14593
12,221,269 B1 * 2/2025 Veduccio ............... B65D 83/30
2006/0175355 A1 8/2006 Glucksman et al.
2006/0278657 A1 * 12/2006 Roatis .................. B67D 1/0079 222/129.1
2008/0029541 A1 2/2008 Wallace et al.
2009/0053331 A1 * 2/2009 Cook ..................... A61K 36/61 222/321.9
2009/0314849 A1 * 12/2009 Litten-Brown ........... A61L 9/14 239/1
2010/0012679 A1 1/2010 Brownlee
2013/0068783 A1 * 3/2013 Gasper ................... B65D 83/68 222/162
2016/0214849 A1 7/2016 Krueger et al.
2023/0227160 A1 * 7/2023 Kominami .............. B05B 15/14 222/173
2023/0257246 A1 8/2023 Fantappie et al.
2023/0356920 A1 * 11/2023 Kominami ............ B05B 7/1686
2024/0199402 A1 * 6/2024 Gormley .............. B67D 1/1202
2024/0336469 A1 * 10/2024 Levey .................. B67D 1/0079

* cited by examiner

BEVERAGE FLAVOR DOSING SYSTEM

FIELD

This disclosure relates to systems and methods for dispensing flavorings or other additives to beverages.

BACKGROUND

Adding flavorings to a diluent, such as still water, to create a flavored beverage is a desirable way to create on-demand flavored beverages. However, in situations where there is an existing source of diluent, such as a plain water cooler or a sparkling water dispenser, adding the ability to dispense one or more flavorings in a simple and easy to use system is a desirable alternative to replacing the existing system with a more costly multi-beverage dispenser. Further, the ability to dispense flavorings should have minimal logistical requirements such as power, space, or plumbing requirements to improve installation flexibility. Existing solutions include having various bottles or packets of flavoring placed next to the water dispenser. But this solution requires considerable space to add multiple flavors, is not aesthetically pleasing, and does not allow for easy expansion for multiple flavorings or for fixed-dosing dispensing of the flavoring. Thus, there exists a need for an easy to use flavor dispensing apparatus that can be installed in a variety of environments and presents an improved user experience as compared to existing solutions.

BRIEF SUMMARY

An aspect of a flavor dispenser includes a housing; a nozzle assembly extending from a front wall of the housing; a concentrate container disposed in a container holder inside the housing, the concentrate container fluidly connected to the nozzle assembly; a container cap disposed on an end of the concentrate container; a container holder disposed in the housing, the container holder configured to prevent a portion of the container cap from moving with respect to the container holder; and a pump disposed in the container cap and fluidly connected to an interior of the concentrate container; a pump actuator disposed in the housing configured to move a portion of the concentrate container with respect to the container holder, thereby actuating the pump.

Another aspect of a flavor dispenser includes a housing; a nozzle assembly extending from a front wall of the housing; a concentrate container disposed in a container holder inside the housing, the concentrate container fluidly connected to the nozzle assembly; a container cap disposed on an end of the concentrate container; a container holder disposed in the housing, the container holder configured to prevent a first portion of the container cap from moving with respect to the container holder; a pump disposed in the container cap and fluidly connected to an interior of the concentrate container, the pump formed by the first portion of the cap and a second portion of the cap slidably disposed around the first portion, wherein movement of the second portion with respect to the first portion pumps concentrate from an interior of the concentrate container through the container cap; and a pump actuator disposed in the housing configured to move a portion of the concentrate container with respect to the container holder, thereby actuating the pump.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Reference will now be made in detail to representative aspects illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

An aspect of a flavor dispenser includes a housing; a nozzle assembly extending from a front wall of the housing; a concentrate container disposed in a container holder inside the housing, the concentrate container fluidly connected to the nozzle assembly; a container cap disposed on an end of the concentrate container; a container holder disposed in the housing, the container holder configured to prevent a portion of the container cap from moving with respect to the container holder; and a pump disposed in the container cap and fluidly connected to an interior of the concentrate container; and a pump actuator disposed in the housing configured to move a portion of the concentrate container with respect to the container holder, thereby actuating the pump.

This and other aspects disclosed here have several benefits. For example, this flavor dispenser is relatively compact and can be placed in a variety of locations, such as on a table top or mounted to a wall. It requires no plumbing connections, and in some aspects is powered by an onboard battery, and thus requires no external power connections. Other aspects of the flavor dispenser may have aa standard power connection, in addition to, or in place of, the battery. Thus, the flavor dispenser can be installed with minimal effort. It also presents an improved user experience in both ease of use and aesthetics. These and other benefits, and the structures and functions that enable these benefits, will be discussed in detail below.

Figure 1:
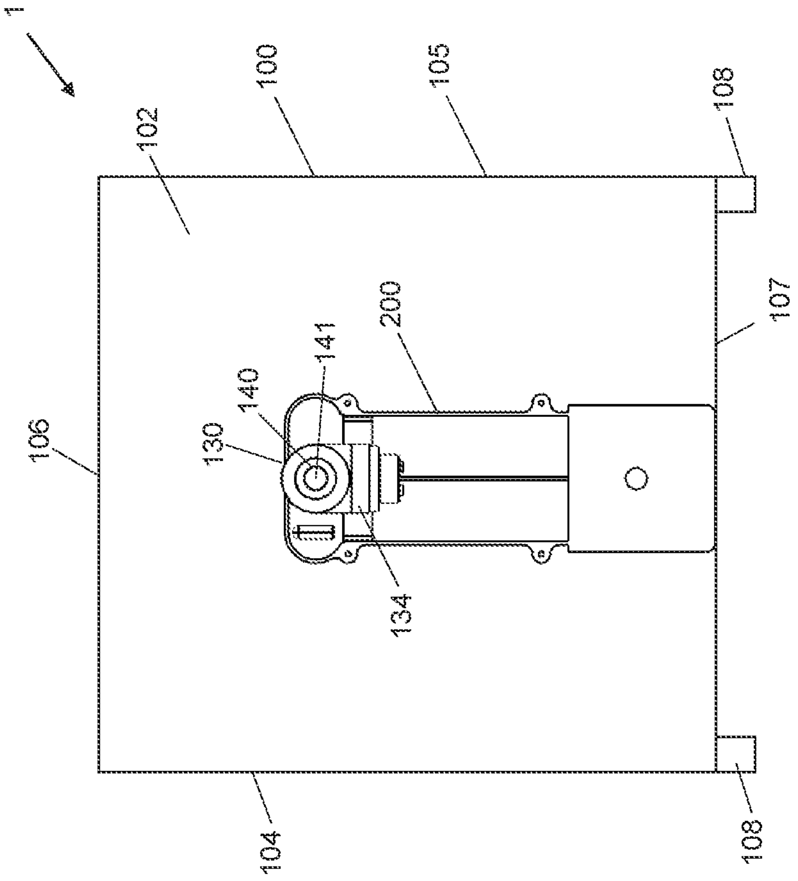
FIG. 1 is a front view of a flavor dispenser according to an aspect.
Figure 2:
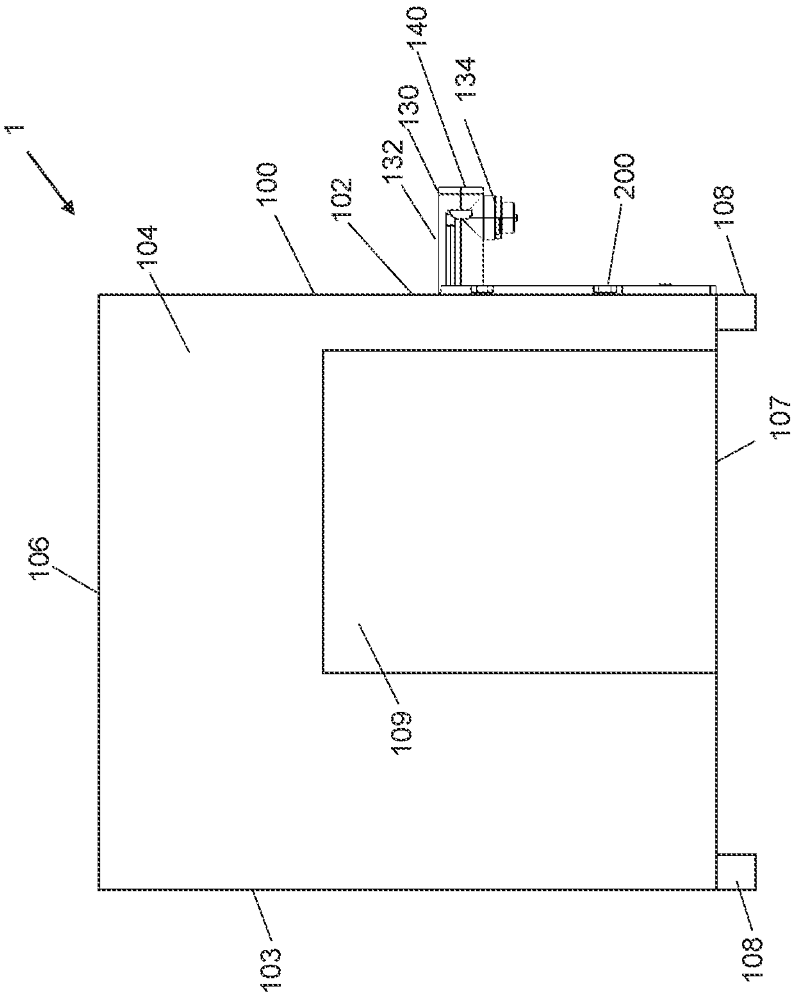
FIG. 2 is a side view of a flavor dispenser according to an aspect.

As shown in FIGS. 1-2, a flavor dispenser 1 is formed with a housing 100. In an aspect, housing 100 can be formed as a rectangular prism with front wall 102, rear wall 103, left wall 104, right wall 105, top wall 106, and bottom wall 107 forming an enclosed space. In this aspect, feet 108 are attached to the bottom of housing 100 for placement of housing 100 on a horizontal surface, such as a tabletop. However, other aspects of housing 100 may not have feet 108, for example, for aspects of housing 100 that are intended for mounting to a vertical wall. In some aspects, feet 108 may be removable from housing 100 to enable housing 100 to be adapted to different mounting situations, including hung on a wall or on the cabinet of a water dispenser. Other aspects of housing 100 can be shaped in any desired enclosed form, including spherical, hexagonal, or other three-dimensional shapes.

As shown in FIG. 2, an access panel 109 is disposed in one of the walls of housing 100 (here, left wall 104). Access panel 109 can be disposed in any of the walls of housing 100, and there can be more than one access panel 109 in aspects of housing 100 depending on the need to access the interior of housing 100. Access panel 109 is a removable section of the corresponding wall that allows access into the interior of housing 100. Access panel 109 can be attached to housing 100 by any suitable method, including through mechanical fasteners, magnets, hinges, or snap fit attachments points. In some aspects, access panel 109 may include a locking element that prevents unauthorized access into the interior of housing 100.

As shown in FIG. 1, in an aspect front wall 102 of housing 100 may include a nozzle assembly 130. Nozzle assembly 130 dispenses concentrate to a user, as will be explained in detail below. As shown in FIG. 1, in an aspect nozzle assembly 130 is centered laterally (i.e., the direction between left wall 104 and right wall 105) on front wall 102. Centering nozzle assembly 130 in this way can present a pleasing appearance and improve user access. However, in other aspects, nozzle assembly 130 can be offset laterally or vertically as needed to accommodate design requirements.

In an aspect, a user interface 140 may be present on the exterior of flavor dispenser 1. For example, user interface 140 may comprise a button 141 disposed on nozzle assembly 130. Button 141 may be a mechanical button (i.e., a button that is spring loaded and is physically depressed), or button 141 may be a touch sensor. In any aspect, button 141 is activated by a user to activate flavor dispenser 1. Other aspects of user interface 140 can include a touchless sensor (e.g., a camera, laser, or other light-based sensor). In other aspects, user interface 140 may be disposed on other portions of housing 100 (e.g., any of front wall 102, rear wall 103, left wall 104, right wall 105, top wall 106).

Figure 3:
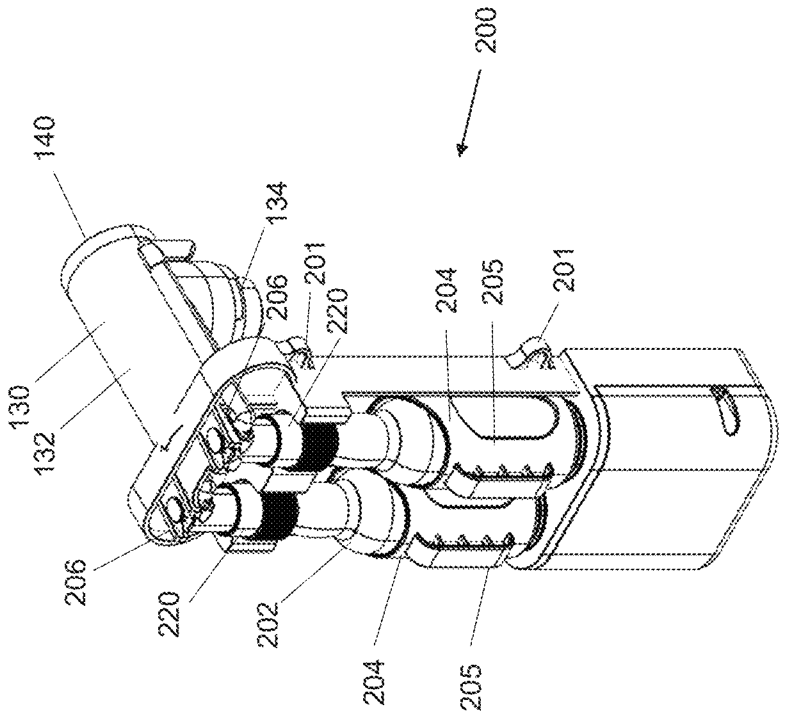
FIG. 3 is a perspective view of a dispensing system of a flavor dispenser according to an aspect.
Figure 4:
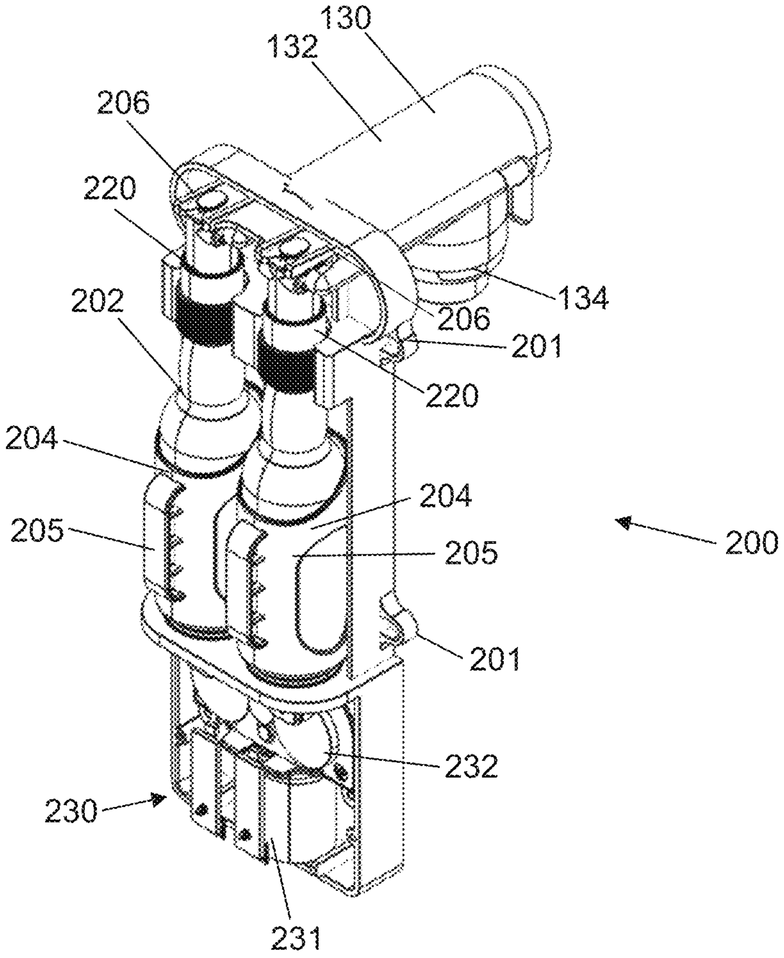
FIG. 4 is a perspective view of a dispensing system of a flavor dispenser according to an aspect.
Figure 5:
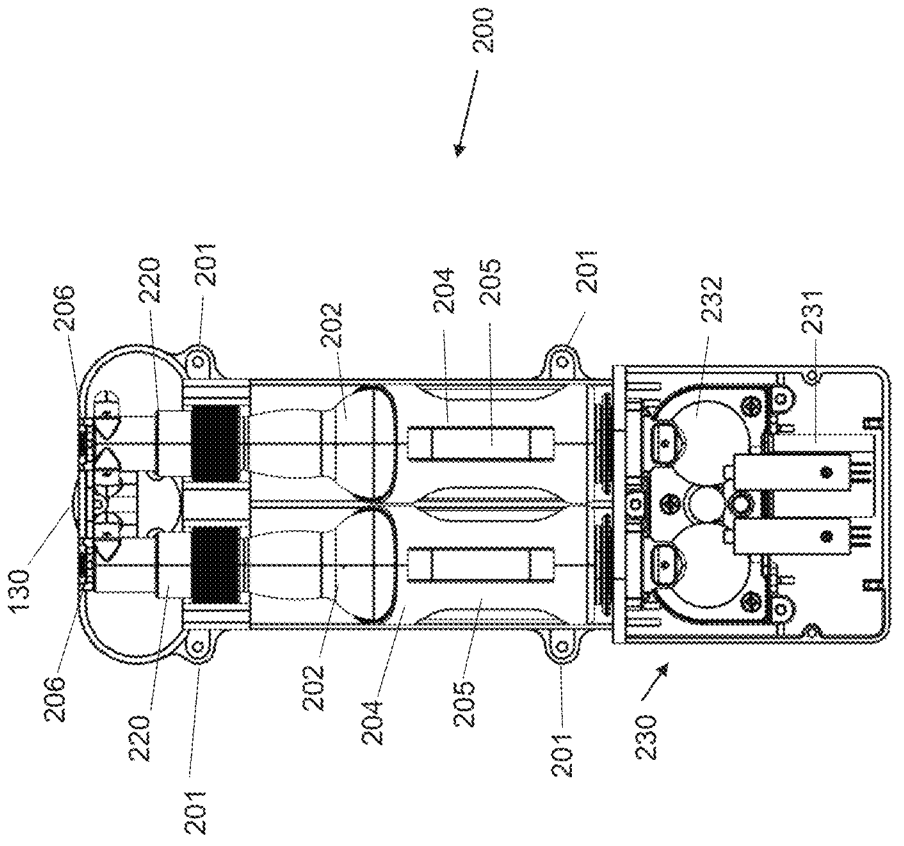
FIG. 5 is a rear view of a dispensing system of a flavor dispenser according to an aspect.

FIGS. 3-5 show a dispensing system 200 isolated from flavor dispenser 1. In the aspect shown in FIGS. 1-2, dispensing system 200 is integrated into standalone housing 100. However, it should be understood that dispensing system 200 can be integrated into an existing support surface, such as an existing beverage dispenser housing, wall, or cabinet. In this way, dispensing system 200 can enable the addition of flavor dispensing in an integrated manner without the need for a separate housing. To this end, dispensing system 200 may have attachment flanges 201 that are configured to enable attachment of dispensing system 200 to a suitable surface. For example, as shown in FIG. 3, attachment flanges 201 have holes that allow for use of mechanical fasteners for attachment of dispenser system 200.

In the aspect of FIGS. 3-5, a pair of concentrate containers 202 are releasably mounted in container holders 204. Other aspects of dispensing system 200 can include one, three, four, five, or more concentrate containers 202 and corresponding container holders 204. Concentrate containers 202 contain concentrates to be dispensed by flavor dispenser 1. For example, concentrates in concentrate containers 202 can include flavorings such as apple, orange, lemon, lime, grapefruit, caramel, and chocolate. Other concentrates can include drink supplements, water enhancers, or additives such as vitamins, minerals, and caffeine.

Container holders 204 are configured to releasably hold concentrate containers 202. In the aspect shown in FIGS. 3-5, container holders 204 comprise a container receiver 205 that is cylindrically shaped with an opening that can receive concentrate container 202. Container holders 204 also include a cap holder 206. In the aspect shown, cap holder 206 is formed as a u-shaped protrusion that is configured to have a snap fit or press fit on container cap 220. In this way, concentrate container 202 is secured in container holder 204 by the combination of being placed in container receiver 205 and then snapped into cap holder 206 (via cap 220 that is attached to the end of concentrate container 202). In these and other aspects of dispensing system 200, container holders 204 may be placed adjacent to each other such that the long axes of concentrate containers 200 are aligned and oriented vertically. This arrangement can reduce the footprint of flavor dispenser 1.

As shown in FIGS. 3-6, nozzle assembly 130 is connected to dispensing system 200 to receive concentrate from concentrate container 202. As shown in FIGS. 2-4, nozzle assembly 130 comprises a nozzle tube 132 extending outwards from dispensing system 200 (and the corresponding wall of housing 100). Nozzle tube 132 acts to support nozzle 134, which can be disposed at or near the distal end of nozzle tube 132. Nozzle 134 is configured to position and hold the end of a tube 136 that passes from dispensing system 200 through nozzle tube 132. In this way, nozzle 134 enables the dispensing of the concentrate from dispensing system 200.

Dispensing system 200 is configured to dispense concentrate from concentrate containers 202 through nozzle assembly 130 to an end user. To do so, dispensing system 200 actuates or moves concentrate container 202 with respect to dispensing system 200. This motion actuates a pump 222 in FIG. 7 that is integrated into cap 220, which, in turn, pumps concentrate out of concentrate container 202 and through nozzle assembly 130 for dispensing.

In the aspect shown in FIGS. 3-8, dispensing system 200 actuates concentrate containers 202 upwards (i.e., towards nozzle assembly 130). A portion of cap 220 is anchored by cap holder 206 and cannot move with respect to flavor dispensing system 200. This, in turn, means that the remaining elements of concentrate container 202 and cap 220 actuate upwards, thereby dispensing concentrate through pump 222 and into nozzle assembly 130. While this aspect of dispensing system 200 actuates concentrate container 202 upwards, a downwards actuation is also possible, either with the configuration shown in the figures (with concentrate container 202 below nozzle assembly 130) or with concentrate container 202 placed above nozzle assembly 130.

Figure 7:
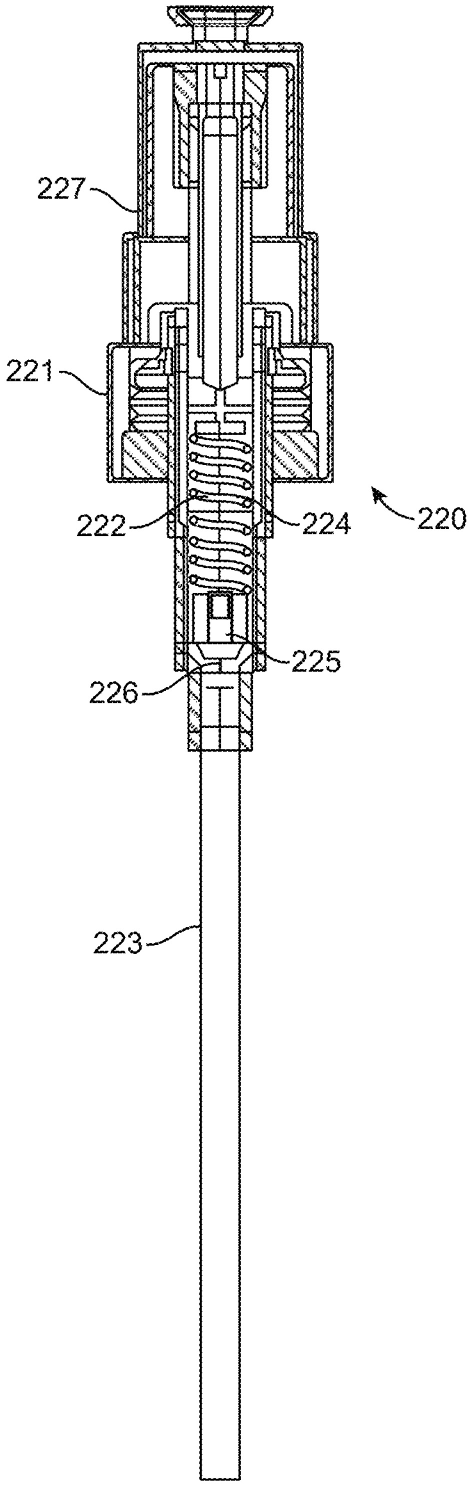
FIG. 7 is a cross section of a concentrate container cap according to an aspect.

A cross-section of an aspect of cap 220 is shown in FIG. 7. Cap 220 includes a threaded base 221 configured to removably mate with an end of concentrate container 202. Thus, threaded base 221 is fixed to, and moves with, concentrate container 202. Pump 222 includes a tube 223 that extends into concentrate container 202 to provide a fluid connection to the concentrate. Pump 222 functions through the use of a spring 224 that pushes a ball 225 into a ball seat 226 at the upper (cap) end of tube 223. The upper portion 227 of cap 220 is slidably disposed in threaded base 221 and is fixed to tube 223, ball seat 226, spring 224, and ball 225. Spring 224 urges upper portion 227 upwards away from threaded base 221.

In operation, the upwards motion of upper portion 227 with respect to threaded base 221 acts to suction concentrate up tube 223 and into the passage surrounding spring 224 and ball 225. Downwards motion of upper portion 227 presses ball 225 into ball seat 226 at the top of tube 223, blocking fluid from flowing through tube 223. The downwards motion also reduces the space in the passage surrounding spring 224 and ball 225, which has the effect of pumping concentrate out of pump 222 through tube 136, which is fluidly connected to upper portion 227.

Figure 6:
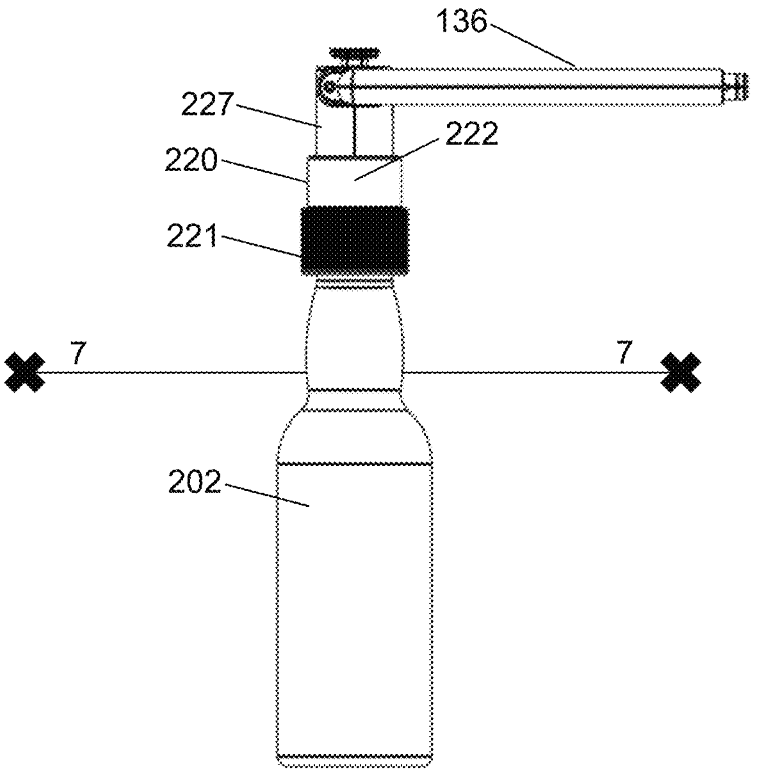
FIG. 6 is a side view of a concentrate container according to an aspect.

In some aspects, the connection between tube 136 and upper portion 227 can be fixed, for example, in the position shown in FIG. 6. In other aspects, tube 136 can be pivotally mounted to upper portion 227 such that it can pivot downwards (towards the bottom of FIG. 6) from the position shown in FIG. 6 to align with the long axis of concentrate container 202. This pivotal mounting can include an on/off feature in upper portion 227 that allows concentrate container to be fluidly connected or disconnected to tube 136 through the pivoting motion of tube 136.

Figure 8:
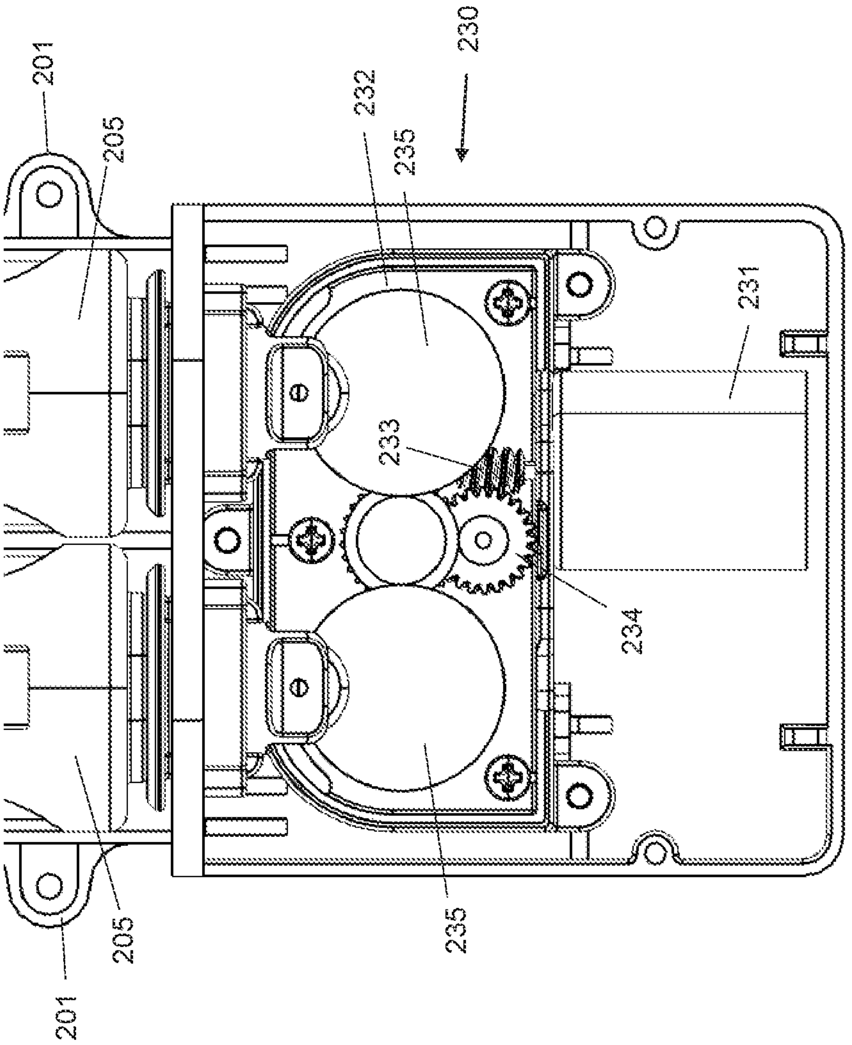
FIG. 8 is a detail view of a pumping assembly according to an aspect.

The motion of concentrate container 202 that actuates pump 222 is provided by pump actuator 230. A detail view of an aspect of pump actuator 230 is shown in FIG. 8. Certain components have been removed from FIG. 8 for clarity. This aspect of pump actuator 230 is disposed in the lower portion of dispensing system 200, immediately below container holders 204. A pump motor 231 is oriented vertically and disposed below gearbox 232. Pump motor 231 rotates a worm gear 233 that powers gearbox 232 by rotating a corresponding gear 234. The rotation of gear 234 powers the movement of concentrate plungers 235, each of which is associated with one of concentrate containers 202. Alternative aspects of pump actuator 230 can include, for example, linear actuators linked to the bottom of each concentrate containers 202 (via container holders 204) or a rack and pinion system that can move container holders 204 linearly in dispensing system 200.

Flavor dispenser 1 may be connected to the dispenser physically located near flavor dispenser 1 through a wireless connection (e.g., Bluetooth) or a hard wired connection (e.g., a USB cable). Flavor dispenser 1 can interface with this other dispenser and, through the other dispenser, can be connected to an external data network, the internet, or the cloud. Examples of functionality that can be enabled using this feature can include transmitting telemetry from flavor dispenser 1 that includes the onboard consumable state which can aid in replenishment and maintenance of flavor dispenser 1. Consumable tracking can be accomplished by tracking the number of dispenser cycles that have occurred since consumable replacement in flavor dispenser 1.

The structures described above can be made from any suitable material, including, for example, metal, plastics, composites, wood, fiber materials, or a combination thereof. In some aspects, housing 100 is made from plastic or metal materials painted, dyed, or coated in a desirable color scheme.

An aspect of a method of operation of flavor dispenser 1 begins with loading concentrate containers 202 into container holders 204 via access hatch 109. If necessary, tube 136 is pivoted into the activated position to ensure concentrate can flow from concentrate container 202. After access hatch 109 is replaced, flavor dispenser 1 can be placed into operation by connecting flavor dispenser 1 to a suitable power source. A user activates flavor dispenser 1 to dispense a desired concentrate. Pump actuator 230 actuates the corresponding pump motor 231, which, through gearbox 232, displaces the correct concentrate container 202 upwards. This motion, in turn, actuates pump 222 in cap 220 to push concentrate into tube 136 and out of nozzle 130 for dispensing.

It is to be appreciated that the Detailed Description section, and not the Summary and Abstract sections, is intended to be used to interpret the claims. The Summary and Abstract sections may set forth one or more but not all exemplary aspects of the present invention(s) as contemplated by the inventors, and thus, are not intended to limit the present invention(s) and the appended claims in any way.

The foregoing description of the specific aspects will so fully reveal the general nature of the invention(s) that others can, by applying knowledge within the skill of the art, readily modify or adapt for various applications such specific aspects, without undue experimentation, and without departing from the general concept of the present invention(s). Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary aspects, but should be defined only in accordance with the following claims and their equivalents.

What is claimed is:

1. A flavor dispenser, comprising:
- a housing;
- a nozzle assembly extending from a front wall of the housing;
- a container holder disposed in the housing;
- a concentrate container disposed in the container holder, the concentrate container fluidly connected to the nozzle assembly;
- a container cap disposed on an end of the concentrate container, wherein the container holder is configured to prevent a portion of the container cap from moving with respect to the container holder;
- a pump disposed in the container cap and fluidly connected to an interior of the concentrate container; and
- a pump actuator disposed in the housing configured to move a portion of the concentrate container cap with respect to the container holder, thereby actuating the pump,
- wherein the container cap comprises a tube that fluidly links the cap to the nozzle assembly,
- wherein the tube is pivotally connected to an exterior of the container cap such that the tube can be pivoted between a first position where the tube is fluidly connected to an interior of the concentrate container and a second position where the tube is not fluidly connected to an interior of the concentrate container.

2. The flavor dispenser of claim 1, where the pump is actuated by movement of a second portion of the container cap that is fixed to the concentrate container with respect to the portion of the cap that is fixed to the container holder.

3. The flavor dispenser of claim 1, wherein the nozzle assembly comprises a nozzle tube that extends from the front wall of the housing, and a nozzle disposed near a distal end of the nozzle tube, the nozzle configured to dispense concentrate.

4. The flavor dispenser of claim 1, wherein the flavor dispenser does not require connection to an external source of diluent.

5. The flavor dispenser of claim 1, further comprising:

a second concentrate container disposed in a second container holder adjacent to the container holder, the second concentrate container fluidly connected to the nozzle assembly;

a second concentrate cap disposed on an end of the second concentrate container;

a second pump disposed in the container cap and fluidly connected to an interior of the concentrate container;

wherein the pump actuator is further configured move a portion of the second concentrate container with respect to the second container holder, thereby actuating the second pump.

6. A dispensing system, comprising:

a container holder disposed in a housing;

a concentrate container disposed in the container holder, the concentrate container fluidly connected to a nozzle assembly;

a container cap disposed on an end of the concentrate container, wherein the container holder is configured to prevent a portion of the container cap from moving with respect to the container holder;

a pump disposed in the container cap and fluidly connected to an interior of the concentrate container; and a pump actuator disposed in the housing configured to move a portion of the concentrate container cap with respect to the container holder, thereby actuating the pump, a second concentrate container disposed in a second container holder adjacent to the container holder, the second concentrate container fluidly connected to the nozzle assembly;

a second concentrate cap disposed on an end of the second concentrate container;

a second pump disposed in the container cap and fluidly connected to an interior of the concentrate container;

wherein the pump actuator is further configured move a portion of the second concentrate container with respect to the second container holder, thereby actuating the second pump.

7. The dispensing system of claim 6, further comprising attachment flanges configured to attach the dispensing system to a support surface.

8. The dispensing system of claim 6, wherein the container cap comprises a tube that fluidly links the cap to the nozzle assembly, wherein the tube is pivotally connected to an exterior of the container cap such that the tube can be pivoted between a first position where the tube is fluidly connected to an interior of the concentrate container and a second position where the tube is not fluidly connected to an interior of the concentrate container.

9. The dispensing system of claim 7, where the pump is actuated by movement of a second portion of the container cap that is fixed to the concentrate container with respect to the portion of the cap that is fixed to the container holder.

10. The dispensing system of claim 7, wherein the nozzle assembly comprises a nozzle tube that extends from the front wall of the housing, and a nozzle disposed near a distal end of the nozzle tube, the nozzle configured to dispense concentrate.

11. The dispensing system of claim 7, wherein the dispensing system does not require connection to an external source of diluent.

12. A flavor dispenser, comprising:

a housing;

a nozzle assembly extending from a front wall of the housing;

a container holder disposed in the housing;

a concentrate container disposed in the container holder, the concentrate container fluidly connected to the nozzle assembly;

a container cap disposed on an end of the concentrate container, wherein the container holder is configured to prevent a first portion of the container cap from moving with respect to the container holder;

a pump disposed in the container cap and fluidly connected to an interior of the concentrate container, the pump formed by the first portion of the container cap and a second portion of the container cap slidably disposed around the first portion, wherein movement of the second portion with respect to the first portion pumps concentrate from an interior of the concentrate container through the container cap; and a pump actuator disposed in the housing configured to move a portion of the concentrate container with respect to the container holder, thereby actuating the pump.

13. The flavor dispenser of claim 12, wherein the container cap comprises a tube that fluidly links the cap to the nozzle assembly, wherein the tube is pivotally connected to an exterior of the container cap such that the tube can be pivoted between a first position where the tube is fluidly connected to an interior of the concentrate container and a second position where the tube is not fluidly connected to an interior of the concentrate container.

14. The flavor dispenser of claim 12, wherein the container cap comprises a tube extending into the concentrate container, and wherein the pump comprises a spring that biases the second portion away from the first portion and a ball that selectively closes the tube when the second portion is moved towards the first portion.

15. The flavor dispenser of claim 12, wherein the nozzle assembly comprises a nozzle tube that extends from the front wall of the housing, and a nozzle disposed near a distal end of the nozzle tube, the nozzle configured to dispense concentrate.

16. The flavor dispenser of claim 12, wherein the flavor dispenser does not require connection to an external source of diluent.

17. The flavor dispenser of claim 12, further comprising:

a second concentrate container disposed in a second container holder adjacent to the container holder, the second concentrate container fluidly connected to the nozzle assembly;

a second concentrate cap disposed on an end of the second concentrate container;

a second pump disposed in the container cap and fluidly connected to an interior of the concentrate container;

wherein the pump actuator is further configured move a portion of the second concentrate container with respect to the second container holder, thereby actuating the second pump.

* * * * *